US010073869B2

(12) United States Patent
Singh et al.

(10) Patent No.: US 10,073,869 B2
(45) Date of Patent: Sep. 11, 2018

(54) VALIDATING MIGRATION DATA BY USING MULTIPLE MIGRATIONS

(71) Applicant: Microsoft Technology Licensing, LLC, Redmond, WA (US)

(72) Inventors: Jaskaran Singh, Redmond, WA (US); Sina Hakami, Bothell, WA (US); Szymon Madejczyk, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 414 days.

(21) Appl. No.: 14/866,431

(22) Filed: Sep. 25, 2015

(65) Prior Publication Data

US 2017/0091181 A1 Mar. 30, 2017

(51) Int. Cl.
*G06F 17/30* (2006.01)

(52) U.S. Cl.
CPC ...... *G06F 17/303* (2013.01); *G06F 17/30371* (2013.01)

(58) Field of Classification Search
CPC ............. G06F 17/303; G06F 17/30371; G06F 17/30864
See application file for complete search history.

(56) References Cited

U.S. PATENT DOCUMENTS

| 7,415,591 | B1 | 8/2008 | Todd et al. |
| 8,024,603 | B2 | 9/2011 | Kono et al. |
| 8,332,847 | B1 | 12/2012 | Hyser et al. |
| 8,392,753 | B1 | 3/2013 | Don et al. |
| 8,719,520 | B1 | 5/2014 | Piszczek et al. |
| 8,762,662 | B1* | 6/2014 | Blitzer .................. G06F 3/0605 711/114 |
| 9,146,913 | B2* | 9/2015 | Gorbaty .............. G06F 17/2211 |
| 2003/0028555 | A1* | 2/2003 | Young ................... G06F 17/303 |
| 2007/0214194 | A1 | 9/2007 | Reuter |
| 2007/0226304 | A1* | 9/2007 | Virk ..................... G06Q 10/107 709/206 |
| 2007/0238524 | A1* | 10/2007 | Harris .................... A63F 13/75 463/42 |

(Continued)

OTHER PUBLICATIONS

Woodsford, P. A., "System Architecture for Integrating GIS and Photogrammetric Data Acquisition", In the International Archives of the Photogrammetry, Remote Sensing and Spatial Information Sciences, vol. 34, Part XXX, Jul. 12, 2004, 8 pages.

(Continued)

*Primary Examiner* — Leslie Wong
(74) *Attorney, Agent, or Firm* — Workman Nydegger

(57) ABSTRACT

Migrating data from a source data store to a destination data store and validating the migrated data. The method includes migrating data from a first data store to a second data store using a first protocol to create a first set of comparison data. The method further includes migrating the data from the first data store to the second data store using a second protocol to create a second set of comparison data. The method further includes comparing the first set of comparison data to the second set of comparison data. The method further includes validating migration of the data from the first data store to the second data store based on comparing the first set of comparison data and the second set of comparison data.

20 Claims, 3 Drawing Sheets

(56) References Cited

U.S. PATENT DOCUMENTS

| | | | | |
|---|---|---|---|---|
| 2011/0276675 | A1* | 11/2011 | Singh | G06F 9/4856 709/223 |
| 2011/0296288 | A1* | 12/2011 | Gorbaty | G06F 17/2211 715/205 |
| 2012/0265726 | A1* | 10/2012 | Padmanabhan | G06F 17/303 707/602 |
| 2013/0198130 | A1* | 8/2013 | Resch | G06F 17/30106 707/609 |
| 2013/0212200 | A1* | 8/2013 | Dennis | H04L 51/22 709/206 |
| 2014/0222766 | A1* | 8/2014 | Sitt | G06F 17/303 707/687 |
| 2015/0019488 | A1 | 1/2015 | Higginson et al. | |
| 2015/0020059 | A1 | 1/2015 | Davis | |
| 2015/0046389 | A1* | 2/2015 | Dhayapule | G06F 17/30563 707/602 |
| 2015/0178014 | A1 | 6/2015 | Nelson | |
| 2016/0099998 | A1* | 4/2016 | Richman | H04L 67/1095 709/202 |
| 2016/0253339 | A1* | 9/2016 | Ambrose | G06F 3/0608 707/693 |
| 2016/0261584 | A1* | 9/2016 | Dennis | H04L 63/083 |
| 2017/0061027 | A1* | 3/2017 | Chesla | G06F 17/30876 |

OTHER PUBLICATIONS

"Data Storage for a New Generation", Retrieved on: Jul. 31, 2015, Available at: http://storiant.com/resources/Storiant_Technology_Deep_Dive.pdf.

Varde, Mahesh, "Meta Data Migration", Published on: Apr. 19, 2014, Available at: http://www.slideshare.net/mvarde1/meta-data-migration.

"Successful Data Migration", In Oracle White Paper, Oct. 2011, 15 pages.

"How to Migrate Mailboxes from One Office 365 Tenant to Another", Retrieved on: Jul. 31, 2015, Available at: https://support.office.com/en-za/article/How-to-migrate-mailboxes-from-one-Office-365-tenant-to-another-65af7d77-3e79-44d4-9173-04fd991358b7.

Katzoff, David, "How to Implement an Effective Data Migration Testing Strategy", Published on: Nov. 30, 2009, Available at: http://www.datamigrationpro.com/data-migration-articles/2009/11/30/how-to-implement-an-effective-data-migration-testing-strateg.html.

Ranganathan, Swati, "Phases of Data migration: Validation", Published on: Sep. 2009, Available at: http://improveprocess.blogspot.in/2009/09/phases-of-data-migration-validation.html.

Mittal, et al., "Oracle-Data-Migration", In White Paper, Jul. 6, 2015, 32 pages.

International Search Report and Written Opinion for PCT/US2016/052368 dated Nov. 24, 2016.

Sadalage, "8 Techniques for Testing Migration of Data from Legacy Systems", Passionate About Data: Data and Its Implications on Software Design and Development, Feb. 15, 2015.

U.S. Appl. No. 14/866,406, filed Sep. 25, 2015, Singh et al.

Chellamuthu, Prabhu, "Data Migration Challenges and Solution for Successful Implementation", Sep. 18, 2014. Available at <<https://www.linkedin.com/pulse/20140918151302-65816706-data-migration-challenges-and-solution-for-successful-implementation>>.

Rathika, et al., "Automated Data Validation Framework for Data Quality in Big Data Migration Projects", In Proceedings of SSRG International Journal of Computer Science and Engineering, vol. 1 Issue 10, Dec. 2014, pp. 24-27.

"How to Migrate Mailboxes from one Office 365 Tenant to another", Available at least as early as Jul. 10, 2015. Available at <<https://support.office.com/en-sg/article/How-to-migrate-mailboxes-from-one-Office-365-tenant-to-another-65af7d77-3e79-44d4-9173-04fd991358b7>>.

Kreuz, et al., "Migrating Oracle Databases", In Oracle White Paper, Jun. 2014, 23 pages.

Jindal, Swati, et al., "Effective Testing & Quality Assurance in Data Migration Projects", Published on: Apr. 5, 2014. Available at <<http://www.Intinfotech.com/resources/documents/Testing_Quality_Assurance_in_Data_Migration_Projects.pdf>>.

"International Search Report and Written Opinion Issued in PCT Application No. PCT/US2016/052365", dated Nov. 11, 2016, 14 Pages.

"Data Migration", Retrieved from <<https://en.wikipedia.org/w/index.php?title=Data_migration&oldid=667163219>>, Jun. 16, 2015, 4 Pages.

Office Action cited in U.S. Appl. No. 14/866,406 dated Dec. 28, 2017.

Office Action cited in U.S. Appl. No. 14/791,148 dated Dec. 29, 2017.

"Final Office Action Issued in U.S. Appl. No. 14/866,406", dated Jul. 26, 2018, 28 Pages.

* cited by examiner

VALIDATING MIGRATION DATA BY USING MULTIPLE MIGRATIONS

BACKGROUND

Background and Relevant Art

Computers and computing systems have affected nearly every aspect of modern living. Computers are generally involved in work, recreation, healthcare, transportation, entertainment, household management, etc.

Data is often migrated from one data store to a second data store. This may occur as new systems are implemented. There is a desire to preserve data from old systems and to move that data to new systems. For example, a legacy online calendaring system (such as Hotmail available from Microsoft, Corporation of Redmond, Wash.) may store user data including calendar items. A new online system (such as Office 365 is also available from Microsoft, Corporation of Redmond, Wash.) may, in addition to new rich functionality, also include calendaring functionality that may be able to make use of user data from the legacy calendaring system. Thus, it may be advantageous to move data from the legacy online email system to the new online system.

Migrating data typically involves the new system obtaining the data, using some standardized file format (such as iCalendar in the email example above). Thus, data will be taken from a native format of the first system, transformed into a standardized file format, transmitted to and received by the second system, transformed into a native format for the second system, and stored at a data store for the second system. There exist various opportunities along this process for portions of the data to not be transferred, or for portions of the data to become corrupted at the second system.

Thus, it may be useful to validate the data migration. One general validation that has been used to validate a migration is to evaluate a corrupt item count, which essentially is the count of data items which cannot be migrated. This is sufficient to catch data loss at the service level, but is not ideal from a user perspective. In particular, for a given user, it is unknown whether or not that user's individual data was successfully migrated.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method for migrating data from a source data store to a destination data store and validating the migrated data. The method includes migrating data from a first data store to a second data store using a first protocol to create a first set of comparison data. The method further includes migrating the data from the first data store to the second data store using a second protocol to create a second set of comparison data. The method further includes comparing the first set of comparison data to the second set of comparison data. The method further includes validating migration of the data from the first data store to the second data store based on comparing the first set of comparison data and the second set of comparison data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

When data is migrated over from a first source system to a second destination system, typical validation includes generating a list of items which could not be converted between the two systems. In contrast, embodiments described herein migrate data from a source system to a destination system a plurality of different times using a plurality of different protocols, such that a plurality of different migrated data sets are created. The migrated data sets are compared to one another to determine if each of the migrated data sets matches.

Particular attention may be placed on validating migrations for individual user data as each user is migrated from a source system to a destination system.

For example, to catch inconsistencies from a user point of view, embodiments may implement a validation sub routine which is initiated once all of a user's data has been migrated over from the source system to the destination system, but before the user is allowed to access the data at the destination system. Any inconsistencies between individual corresponding data items for different data migrations are detected and are reported as a corrupt data item.

For example, when migrating data from a source system such as Hotmail, available from Microsoft Corporation of Redmond, Wash. to Office 365, also available from Microsoft Corporation of Redmond Wash., after data has been migrated from Hotmail to Office 365 using the iCalendar file format, embodiments may use the Exchange ActiveSync (EAS) data protocol with IP filtering based authentication to migrate the data again for the user from the source data store to the destination data store and then compare it with the data stored in a migrated mailbox for the user.

Note that in some embodiments, the migration and/or validation may be done on a per user account level. In particular, embodiments may be implemented where data is migrated over and validated for each user at a user granularity. Thus, for example, in one embodiment, data may be migrated by using mailbox operations on a user's mailbox, as opposed to migrating user data as part of a wholesale and indiscriminate migration of all data on a server.

In particular, a user's data is identified individually and migrated based on the data belonging to the particular user. This may be performed a plurality of times using a plurality of different protocols. Once the data has been migrated, operations may be performed, again at a user account level, to compare the different migrations. Thus, rather than validating the entire destination server as a whole, data can be validated at a user level and released at the user level. In this way, even if there are errors and/or delays in migrating data, only the users affected by those errors and/or delays will not be able to obtain their data at the destination server, while unaffected users will be able to obtain their data as soon as it is migrated and validated.

Figure 1:
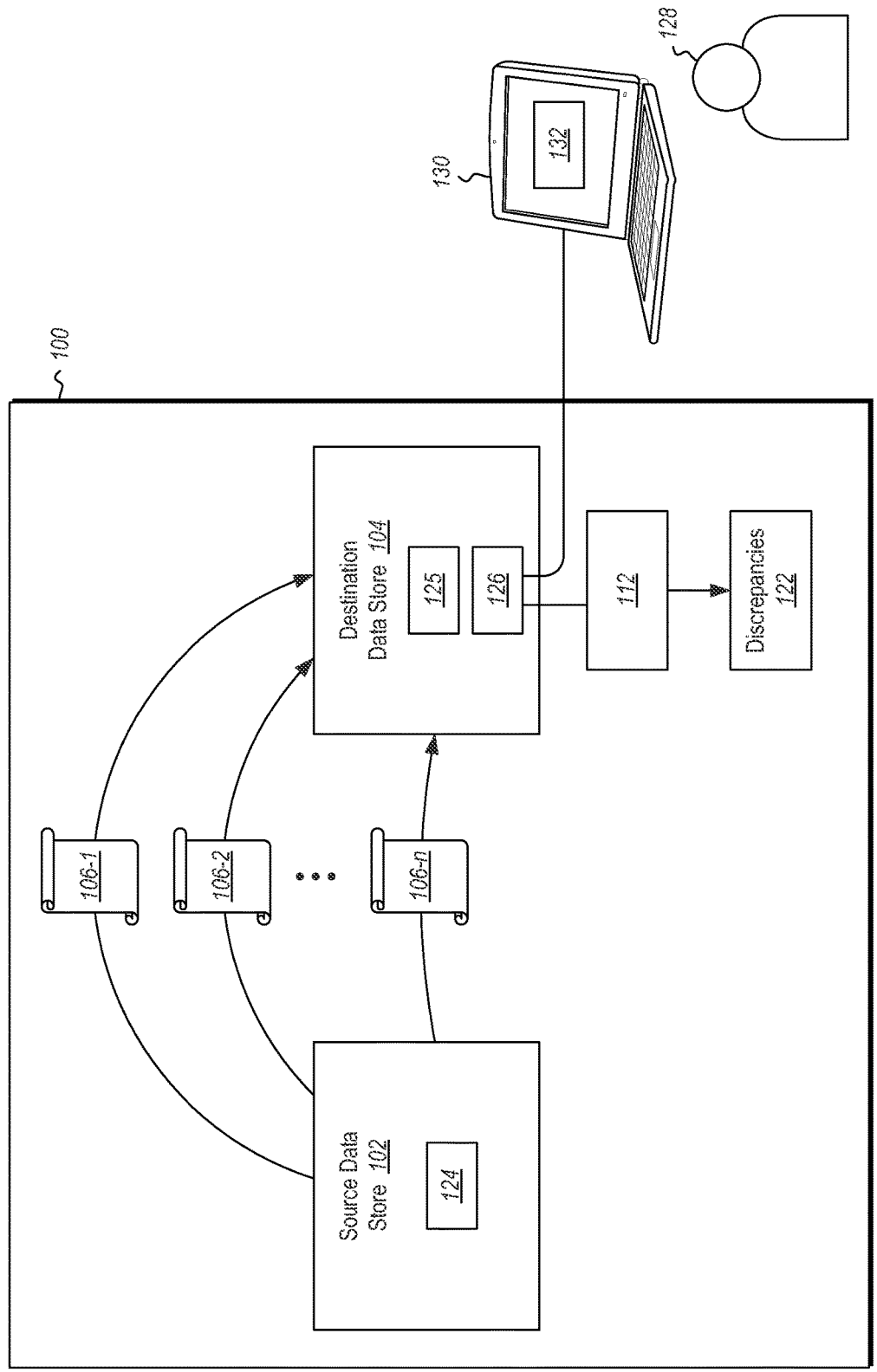
FIG. 1 illustrates a system for comparing data which has been migrated from a source data store to a destination data store.

Referring now to FIG. 1, an example is illustrated. FIG. 1 illustrates a source data store 102. The source data store 102 has mailboxes for users, such as the mailbox 124 for a user 128. There may be a desire to migrate user data from the mailbox 124 to the mailbox 126 at the destination data store 104. For example, a user's email and/or calendar data may be migrated from a legacy system (e.g., source data store 102) to a modern system (e.g., destination data store 104).

To accomplish this functionality, data is migrated a plurality of times from the source data store 102 to the destination data store 104 by a migration agent 125. For example, FIG. 1 illustrates that a data set 106-1 is migrated from the source data store 102 to the destination data store 104 in a first migration. A data set 106-2 is migrated in a second migration. And, a data set 106-n is migrated in an nth migration. As indicated by the 'n', any number of migrations could be performed.

The migration agent 125 may be a computer implemented tool that is able to query for and transfer data. The migration agent 125 may be a combination of separate tools used for querying and transferring data. For example, the migration agent 125 may include a number of different client modules that are capable of querying data stores in various different protocols. Note that while the migration agent 125 is illustrated at the destination data store 104, it may be implemented in other portions of the system 100, including as a stand-alone agent.

The migrations from the source data store 102 to the destination data store 104 may be at a user granularity level, and may be migrations from a mailbox 124 for a user 128 at the source data store to a mailbox 126 for the user 128 at the destination data store. Alternatively, the migrations may be at coarser granularity, such as an enterprise level or other appropriate level.

Each of the migrations may be performed using a different protocol and/or file format. For example, one migration may be performed using the iCalendar file format. A different migration may be performed using the Exchange ActiveSync (EAS) data protocol (potentially with IP filtering based authentication to get the Calendar data for specific users). Still, other migrations may be performed using one or more of vCalendar, vCard, EML, EWS, PST, POP, IMAP, MAPI, EAS, SMTP, etc. Using different file formats, even when the same underlying transport protocol is used for two different data transfers, should be considered, as used herein, as different protocols.

Once the data sets 106-1 through 106-n have been migrated to the destination data store 104, operations can be performed to compare the data sets to ensure that user data has been successfully migrated. Thus, for example, a comparator 112 may access the data sets 106-1 through 106-n and compare the datasets to each other. The comparator 112 can identify any discrepancies between the data sets 106-1 through 106-n. If there are no discrepancies (or if the number of discrepancies is below some predetermined threshold), then data in the datasets can be released to the user 128 through the mailbox 126 to allow the user to access the data using a client machine 130 and a client application 132.

A number of alternative examples are now illustrated. In one embodiment, one of the data sets (e.g., data set 106-1) may be the primary data set. In this case, the data set 106-1 is the data set intended to be migrated to the destination data store 104, and in particular to the user's mailbox 126. This data set 106-1 may be migrated using a first protocol, such as by migrating iCalendar folders. One or more other data sets (e.g., data sets 106-2 through 106-n) may be migrated using one or more different protocols, such as by using the EAS protocol, and used to verify the migration of the primary data set. This may be done by the comparator 112 directly comparing the primary data set 106-1 to one or more of the other datasets 106-2 through 106-n to identify a set of discrepancies 122. If the primary data set 106-1 and one or more of the other data sets are sufficiently similar, the primary data set 106-1 can be made available to the user 128 through the mailbox 126.

In an alternative embodiment, the data sets 106-1 through 106-n may be migrated using the different protocols and the different data sets 106-1 through 106-n may be used to construct a consensus data set. For example, assume in a simple case that three different data sets using different protocols are migrated. For any particular value, when two of the three data sets agree on that particular value, that particular value can be added to a consensus data set. So long as, for each value (or at least a sufficient number of the values) of interest to the user 128, two of the three data sets agree, then the consensus data set can be constructed and provided to the user 128. If for certain values, there is no agreement by any of the data sets, then an indication can be provided indicating that the data from the source data store 102 was not properly migrated.

In yet another alternative embodiment, when the data sets do not match, a user may be given the ability to resolve any discrepancies. For example, with reference to FIG. 2, a user interface illustrated as discrepancy resolution interface 200 is shown. The discrepancy resolution interface 200 may be provided by the comparator 112 to a user to allow the user to manually resolve discrepancies. One embodiment of the interface allows the user to easily compare the discrepancies between a first data set 202 (e.g., the data set 106-1) and a second data set 204 (e.g., data set 106-2). In this embodiment a user can select a discrepancy by clicking on its representation in either data set 202, 204 and activating an appropriate resolution control 206. Such controls might include, but not be limited to, (1) controls that would allow the user to copy a missing record or field into the data set from which it is missing, (2) delete a record or field from one or both data sets, or (3) keep one version or the other of a record or field that is different in the two data sets.

An embodiment might include a "Cancel" button 208 that would allow the user to abandon any specific resolutions the user had specified, or a "Finished" button 210 which would allow the user to signal that the resolution process is complete.

In the illustrated example, the first data set 202 presents its view of the data discrepancies, and the second data set 204 presents its view of the data. Some items, such as Record 1 or Record 4: Field 1, may be present in Data Set 1, but not present in Data Set 2. Some items, such as Record 2 or Record 4: Field 2, may be present in Data Set 2 but not present in Data Set 1.

Some records and fields, such as Record 3*a* or Record 4: Field 3*a* in Data Set 1 and Record 3*b* or Record 4: Field 3*b* in Data Set 2 may be present in both data sets but may contain different values for the records or fields.

This embodiment of the resolution control interface would allow the user to select a row representing one of the above mentioned discrepancies and, using the resolution controls 206, choose to copy a missing record from one data set to the other, or pick one version of a record of field which contained different values in the data sets and keep that version of the record or field.

In this embodiment the "Cancel" button 208 would allow the user to abandon the resolutions specified. The "Finished" button 210 would allow the user to mark the resolutions as complete.

In some embodiments the comparator may identify patterns in the user's resolutions and use those patterns to refine future migrations from one data store to another such that the future migrations produce fewer discrepancies when comparing the source and destination data sets.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
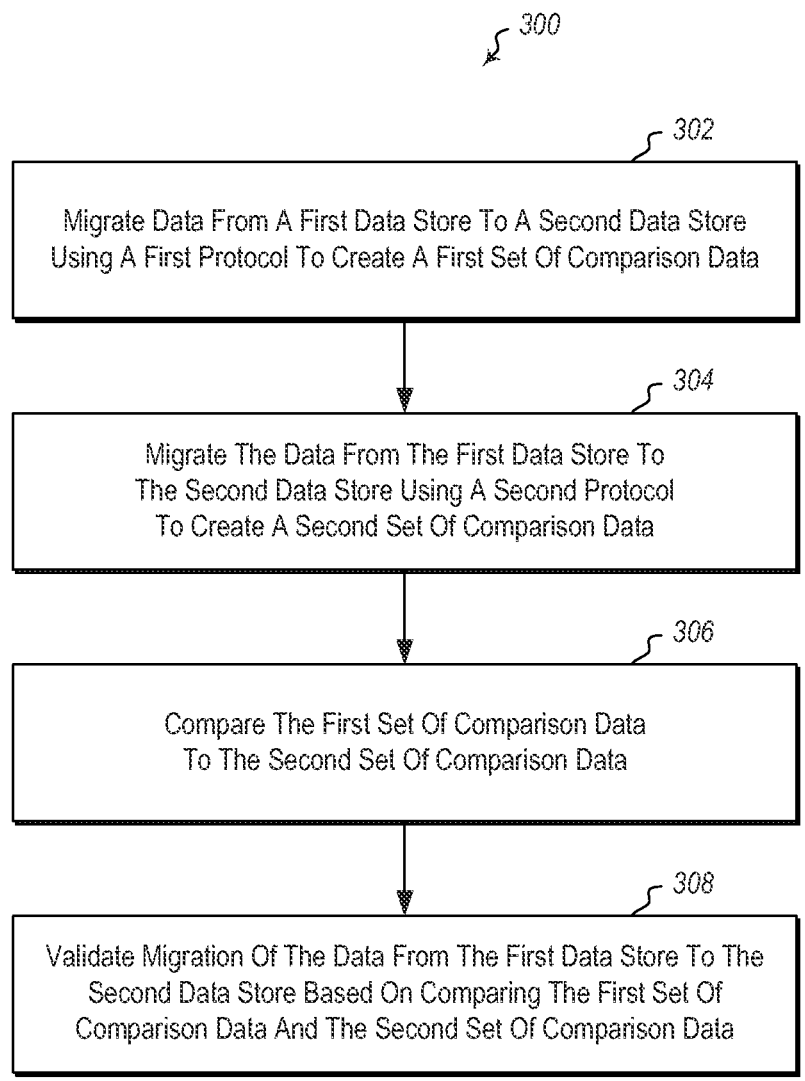
FIG. 3 illustrates a method of migrating data from a source data store to a destination data store and validating the migrated data.

Referring now to FIG. 3, a method 300 is illustrated. The method 300 includes acts for migrating data from a source data store to a destination data store and validating the migrated data. The method includes migrating data from a first data store to a second data store using a first protocol to create a first set of comparison data (act 302). For example, FIG. 1 illustrates the first data set 106-1 is migrated from the source data store 102 to the destination data store 104 using a migration agent 125.

The method 300 further includes migrating the data from the first data store to the second data store using a second protocol to create a second set of comparison data (act 304). Thus, for example, FIG. 1 illustrates that the same data can be migrated as the second data set 106-2 using a migration agent 125 using a different protocol.

The method 300 further includes comparing the first set of comparison data to the second set of comparison data (act 306). Thus, for example, the data set 106-1 could be compared to the data set 106-2 to identify discrepancies such as the set of discrepancies 122.

The method 300 further includes validating migration of the data from the first data store to the second data store based on comparing the first set of comparison data and the second set of comparison data (act 308).

The method 300 may be practiced where validating the migration of the data from the first data store to the second data store comprises determining a measure of discrepancies between the first set of comparison data and the second set of comparison data. For example, in some embodiments, a raw number of errors and/or missing records may be determined. Alternatively or additionally, a percentage of records that are missing/and or have errors could be determined. Alternatively or additionally, embodiments could determine consistently wrong and/or missing fields.

The method 300 may be practiced where validating migration of the data from the first data store to the second data store comprises determining that the migration of the data from the first data store to the second data store reaches a certain accuracy threshold and as a result, the method further comprising activating the second data store for one or more users. Thus for example, once the migration has been determined to be sufficiently accurate, the mailbox 126 could be allowed to be accessed by the user 128.

Figure 2:
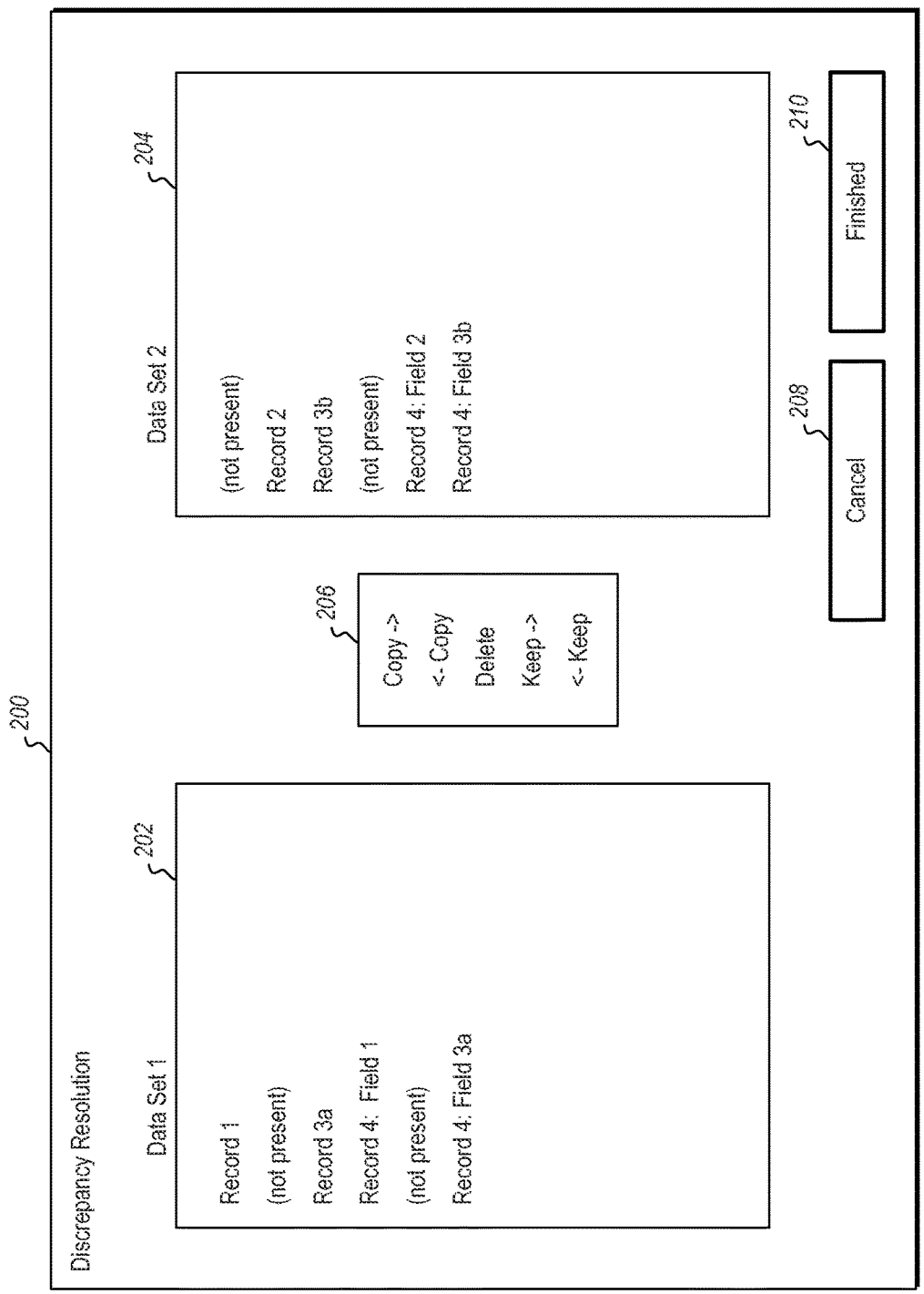
FIG. 2 illustrates one embodiment of a user interface presented to a user to resolve the discrepancies between the source data store and the migrated data in the destination data store.

The method 300 may be practiced where comparing the first set of comparison data with the second set of comparison data produces a set of discrepancies between the first set of comparison data and the second set of comparison data. Thus for example, in some embodiments, the set of discrepancies 122 could be produced as a result of the comparison. In some such embodiments, the set of discrepancies between the first set of comparison data and the second set of comparison data is presented to a user in a user interface that allows the user to resolve discrepancies between the first set of comparison data and the second set of comparison data. For example, FIG. 2 illustrates an example of how discrepancies could be displayed to a user in a user interface to allow the user to resolve discrepancies. In some such embodiments, the one or more patterns of resolution are used to modify one or more subsequent migrations between the first data store and the second data store such that the subsequent migrations produce fewer discrepancies in the set of discrepancies between the first set of comparison data and the second set of comparison data.

The method 300 may further include migrating the data one or more additional times using one or more additional protocols to create one or more additional sets of comparison data. In some such embodiments, the method 300 may further include identifying a consensus between two or more comparison data sets.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of migrating data from a source data store to a destination data store and validating the migrated data, the method comprising:
    migrating, in a first data migration, particular data from a first data store to a second data store using a first format to create a first set of migrated data at the second data store;
    migrating, in a second data migration, the particular data from the first data store to the second data store that was also migrated in the first data migration, but using a second format that is different than the first format used in the first data migration to create a second set of migration data in the second data store, and prior to providing the client access to the particular data at the second data store;
    comparing the first set of migration data to the second set of migration data prior to proving access to the particular data; and
    validating migration of the data from the first data store to the second data store based on at least the comparison of the first set of migration data and the second set of migration data and by at least generating a final set of migration data based on the comparison; and
    after generating the final set of migration data, providing access to the particular data at the second data store as the final set of migration data.

2. The method of claim 1, wherein validating the migration of the data from the first data store to the second data store comprises determining a measure of discrepancies between the first set of comparison data and the second set of comparison data.

3. The method of claim 1, wherein validating migration of the data from the first data store to the second data store comprises determining that the migration of the data from the first data store to the second data store reaches a certain accuracy threshold and as a result, the method further comprising activating the second data store for one or more users.

4. The method of claim 1, wherein comparing the first set of comparison data with the second set of comparison data produces a set of discrepancies between the first set of comparison data and the second set of comparison data.

5. The method of claim 4, further comprising presenting the set of discrepancies between the first set of comparison data and the second set of comparison data to a user in a user interface that allows the user to resolve discrepancies between the first set of comparison data and the second set of comparison data.

6. The method of claim 5 further comprising, using the one or more patterns of resolution to modify one or more subsequent migrations between the first data store and the second data store such that the subsequent migrations produce fewer discrepancies in the set of discrepancies between the first set of comparison data and the second set of comparison data.

7. The method of claim 1, further comprising migrating the data one or more additional times using one or more additional protocols to create one or more additional sets of comparison data, and wherein validating migration of the data from the first data store to the second data store comprises identifying a consensus between two or more comparison data sets.

8. A system for migrating data from a source data store to a destination data store and validating the migrated data, the system comprising:
a migration agent, wherein the migration agent is configured to:
migrate, in a first data migration, particular data from a first data store to a second data store using a first format to create a first set of migrated data at the second data store;
migrate, in a second data migration, the particular data from the first data store to the second data store that was also migrated in the first data migration, but using a second format that is different than the first format used in the first data migration to create a second set of migration data in the second data store, and prior to providing the client access to the particular data at the second data store;
compare the first set of migration data to the second set of migration data prior to providing access to the particular data; and
validate migration of the data from the first data store to the second data store based on at lease the comparison of the first set of migration data and the second set of migration data and by at least generating a final set of migration data based on the comparison; and
after generating the final set of migration data, providing access to the particular data at the second data store as the final set of migration data.

9. The system of claim 8, wherein validating the migration of the data from the first data store to the second data store comprises determining a measure of discrepancies between the first set of comparison data and the second set of comparison data.

10. The system of claim 8, wherein validating migration of the data from the first data store to the second data store comprises determining that the migration of the data from the first data store to the second data store reaches a certain accuracy threshold and as a result, the method further comprising activating the second data store for one or more users.

11. The system of claim 8, wherein comparing the first set of comparison data with the second set of comparison data produces a set of discrepancies between the first set of comparison data and the second set of comparison data.

12. The system of claim 11, wherein the comparator is further configured to display the set of discrepancies between the first set of comparison data and the second set of comparison data to a user in a user interface that allows the user to resolve discrepancies between the first set of comparison data and the second set of comparison data.

13. The system of claim 8, wherein the migration agent is further configured to migrate the data one or more additional times using one or more additional protocols to create one or more additional sets of comparison data, and wherein validating migration of the data from the first data store to the second data store comprises identifying a consensus between two or more comparison data sets.

14. A computer system comprising:
one or more processors; and
one or more computer-readable media having stored thereon instructions that are executable by the one or more processors to configure the computer system to migrate data from a source data store to a destination data store and validate the migrated data, including instructions that are executable to configure the computer system to perform at least the following:
migrate, in a first data migration, particular data from a first data store to a second data store using a first format to create a first set of migrated data at the second data store;
migrate, in the second data migration, the particular data from the first data store to the second data store that was also migrated in the first data migration, but using a second format that is different than the first format used in the first data migration to create a second set of migration data in the second data store, and prior to providing the client access to the particular data at the second data store;
comparing the first set of migration data to the second set of migration data prior to providing access to the particular data; and
validating migration of the data from the first data store to the second data store based on at least comparison of the first set of migration data and the second set of migration data and by at least generating a final set of migration data based on the comparison; and
after generating the final set of migration data, providing access to the particular data at the second data store as the final set of migration data.

15. The computer system of claim 14, wherein validating the migration of the data from the first data store to the second data store comprises determining a measure of discrepancies between the first set of comparison data and the second set of comparison data.

16. The computer system of claim 14, wherein validating migration of the data from the first data store to the second data store comprises determining that the migration of the data from the first data store to the second data store reaches a certain accuracy threshold and as a result, the method further comprising activating the second data store for one or more users.

17. The computer system of claim 14, wherein comparing the first set of comparison data with the second set of comparison data produces a set of discrepancies between the first set of comparison data and the second set of comparison data.

18. The computer system of claim 17 further comprising a user interface, and wherein the one or more computer-readable media have stored thereon instructions that are executable by the one or more processors to configure the computer system to present the set of discrepancies between the first set of comparison data and the second set of comparison data to a user in the user interface that allows the user to resolve discrepancies between the first set of comparison data and the second set of comparison data.

19. The computer system of claim 18, wherein the one or more computer-readable media have stored thereon instructions that are executable by the one or more processors to configure the computer system to use the one or more patterns of resolution to modify one or more subsequent migrations between the first data store and the second data store such that the subsequent migrations produce fewer discrepancies in the set of discrepancies between the first set of comparison data and the second set of comparison data.

20. The computer system of claim 14, wherein the one or more computer-readable media have stored thereon instructions that are executable by the one or more processors to configure the computer system to migrate the data one or more additional times using one or more additional protocols to create one or more additional sets of comparison data, and wherein validating migration of the data from the first data store to the second data store comprises identifying a consensus between two or more comparison data sets.

\* \* \* \* \*